US007945057B2

(12) United States Patent
Pakzad

(10) Patent No.: US 7,945,057 B2
(45) Date of Patent: May 17, 2011

(54) PROCEDURE AND DEVICE FOR LINEARIZING THE CHARACTERISTIC CURVE OF A VIBRATION SIGNAL TRANSDUCER SUCH AS A MICROPHONE

(75) Inventor: Samad F. Pakzad, Méry-sur-Oise (FR)

(73) Assignee: Ferdos Innovations LLC, Potomac, MD (US)

( * ) Notice: Subject to any disclaimer, the term of this patent is extended or adjusted under 35 U.S.C. 154(b) by 1237 days.

(21) Appl. No.: 11/364,646

(22) Filed: Feb. 27, 2006

(65) Prior Publication Data

US 2007/0079694 A1 Apr. 12, 2007

Related U.S. Application Data

(60) Provisional application No. 60/656,685, filed on Feb. 25, 2005.

(51) Int. Cl.
*H04B 15/00* (2006.01)

(52) U.S. Cl. ............... 381/93; 381/83; 381/96; 381/318

(58) Field of Classification Search .................... 381/83, 381/92, 93, 96, 103, 317, 318, 312
See application file for complete search history.

(56) References Cited

U.S. PATENT DOCUMENTS

| | | | | |
|---|---|---|---|---|
| 4,354,059 | A | 10/1982 | Ishigaki et al. | |
| 4,792,744 | A * | 12/1988 | Antoine | 323/217 |
| 4,905,290 | A | 2/1990 | Yaoita | |

FOREIGN PATENT DOCUMENTS

| | | | |
|---|---|---|---|
| DE | EP0209894 | A2 * | 1/1987 |
| DE | 42 35 845 | | 4/1994 |
| EP | 0 209 894 | | 1/1987 |
| EP | 0 254 072 | | 1/1988 |
| WO | WO 95 28034 | | 10/1995 |

OTHER PUBLICATIONS

Institut National De La Propriete Industrielle Document dated Nov. 22, 1996.
Institut National De La Propriete Industrielle Document dated Jan. 22, 1998.
Institut National De La Propriete Industrielle Document dated Jun. 25, 1999.
Institut National De La Propriete Industrielle Document dated Nov. 3, 2000.

* cited by examiner

*Primary Examiner* — Vivian Chin
*Assistant Examiner* — Friedrich Fahnert

(57) ABSTRACT

A procedure and device for linearizing the characteristic curve of a vibration signal transducer such as a microphone that includes collecting signals, transmitting the signals, extracting information from the signals, dephasing such information by 180 degrees compared to the initial signals and taking the algebraic sum of the initial signals and dephased information.

15 Claims, 2 Drawing Sheets

PROCEDURE AND DEVICE FOR LINEARIZING THE CHARACTERISTIC CURVE OF A VIBRATION SIGNAL TRANSDUCER SUCH AS A MICROPHONE

This application claims priority to provisional application No. 60/656,685, filed Feb. 25, 2005, the entire contents of which is expressly incorporated herein by reference thereto.

BACKGROUND OF THE INVENTION

Vibration signals, such as sound signals, are transmitted between different points under many circumstances. Many of these require transcoding and/or amplification. For example, orchestras and musical groups play in public, and their sounds must be amplified for a group of listeners; telephones and radios transmit voices and music over long distances, the first via wires, the second via radio waves; hearing aids amplify sounds collected from the user's environment and deliver them to the eardrum or to said user's ear bone structures; television takes images collected using a video camera, transforms them into electronic signals and then recreates them on viewers' screens after decoding.

In all instances, the signals are collected at the transmitting point, transformed into electronic signals, generally amplified, and then reconstituted at the reception point.

The transducers that transform the mechanical vibrations into electronic signals (as is the case for microphones), those that transform the electronic signals into mechanical vibrations (as is the case for speakers), and the devices and components that connect these transducers in a complete system are made from a wide range of materials and active and passive circuits.

The lack of homogeneity that results from these multiple elements has a direct influence on the transmission of signals between the "input" transducer and the "output" transducer, such that the signals are not transferred in a linear manner, making their transfer efficiency variable depending on the frequency used.

For a transducer of any kind, the level of reproduction of the signal based on its frequency must be established, yielding a curve called the "characteristic curve." A device that integrates such a transducer must include methods that allow this curve to be monitored in order to correct, to the extent possible, problems that may occur in signal reproduction.

In addition, during the signal transfer there is a phenomenon that occurs wherein a fraction of the signal transmitted and received by the output transducer returns to the input transducer and is added to the main signal. This phenomenon generates instability in the system and tends to cause signal fluctuations, especially at higher yield frequencies; the more that energy increases, the greater the level of feedback.

The most well-known manifestation of this phenomenon is called the "Larsen effect" or "Larsen." It occurs when input signals, such as voice signals, picked up by, for example, a microphone, are amplified, transmitted to a speaker, and then returned to the microphone which captures them along with the new signals. The new and returned signals are then reamplified, which, due to the non-linear nature of the elements making up the transfer chain, results in a fluctuation of the whole signal, which in turn results in a very loud screech that is characteristic of the Larsen effect.

The microphone thus "hears" not only the voice, but also the speaker, and this effect increases with greater microphone sensitivity, greater speaker volume and shorter distance between the microphone and the speaker.

This phenomenon may be created at will and observed by bringing the microphone of a telephone handset close to a speaker plugged into an amplifier.

There are several known methods for addressing the problems created by this feedback:

- limiting the microphone sensitivity, the theory being that by reducing the input signal, the sounds coming from the speaker will not be picked up;
- limiting the speaker power, the theory being that by reducing the output level, the sounds from the speaker will not reach the microphone; and
- increasing the distance between the microphone and the speaker, or facing them in specific directions, the theory being that reducing the physical proximity between the microphone (input transducer) and the speaker (output transducer) may prevent the sounds from the speaker from being picked up by the microphone.

All of these methods help reduce feedback, but the limitations that they impose often limit the system capabilities and reduce the expected quality. Items such as portable wireless telephones (cell phones) or, to an even greater extent, hearing aids must be contained in the most compact structure possible, which is completely incompatible with the concept of keeping a large distance between the microphone and the speaker (or earpiece in this case). As a result, in such devices, sound levels must automatically be kept low, which is not satisfactory since it limits the possible design options for the device.

Another method for addressing the Larsen effect consists of filtering the signals at one or multiple points in the transfer chain, in order to "trap" the fluctuations. This method is not very effective and it contributes significantly to the non-linear nature of the entire device since the filters themselves are some of the most non-linear devices made. Another disadvantage of this method is that it results in a significant distortion of the output signals, which changes the transmission and seriously affects the qualitative characteristics of the input signals, such as the elimination of treble, muffling, etc.

In the field of telecommunications, feedback has such negative consequences, such as muffling of sound, that duplex links are simply prohibited for critical applications, such as communication of military information. For these applications, duplex links are replaced by "alternative bilateral" links in which only one of two speakers is permitted to talk at a time, or alternatively, the other can listen, but must wait to speak until there is a pause or the speaker will be abruptly interrupted. This is extremely inconvenient and even unusable in certain situations.

SUMMARY OF THE INVENTION

The present invention overcomes these disadvantages by changing each characteristic curve into nearly a straight line, which in turn has the effect of eliminating the instability caused by feedback and fluctuations.

Briefly, one aspect of the invention is a method of processing vibration signals by (1) collecting signals, called "input signals", (2) transmitting and amplifying them, creating "initial signals", (3) extracting "duplicate signals" from the initial signals and dephasing the duplicate signals by 180 degrees from the initial signals, and (4) taking the algebraic sum of the input signals and the signals duplicated by mixing the two, wherein the duplicate signals are extracted, transferred, dephased and mixed at the same level as that of the initial signals, and amplifying the level of the input signals to the level of the initial signals.

Other characteristics of this process may include:

adjusting the level of the duplicate signals to match that of the input signals; and dephasing the duplicate signals and obtaining "image signals", then mixing the input signals and the image signals, then linearly amplifying the signals resulting from this mixing, or dephasing the input signals, then mixing the input signals and the duplicate signals, then linearly amplifying the signals resulting from this mixing; or conducting a single operation to increase the level of the input signal, invert the phase of the duplicate signals and mix these two types of signals, plus linearly amplify the signals resulting from this mixing.

An additional aspect of the invention is a device for the treatment of vibration signals comprising an input pickup-transducer for these signals, electronic transfer circuits, a phase inverter, at least one amplifier, and at least one output transducer-transmitter for processed signals, wherein the electronic circuits include one branch circuit connected to both the output of a linear amplifier and the input of the same linear amplifier, with methods implemented to ensure that the input signal level and output signal level for the linear amplifier are equal.

Other characteristics of this device may include:

an equalizer used to ensure that the input signal level and output signal level for the linear amplifier are equal;

the equalizer being part of the circuits creating the linear amplifier;

the equalizer being adjustable;

the equalizer being placed on the branch circuit;

the equalizer being placed at the input of the linear amplifier;

the phase inverter being placed on the branch circuit; the phase inverter being placed between the input pickup transducer and the linear amplifier, the phase inverter being part of the linear amplifier itself, such as in an "operational amplifier";

a circuit consisting of two transistors placed in a emitter-emitter formation, and a variable resistor linked to the whole.

The invention will be better understood after reading the detailed description below with reference to the figures. Of course, the description and the figures are given only for informational purposes and are not restrictive in nature.

DETAILED DESCRIPTION OF THE PREFERRED EMBODIMENTS

Figure 1:
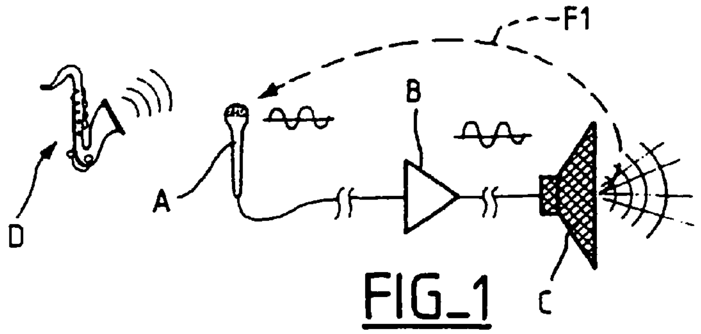
FIG. 1 is a general diagram of a well-known type of device, illustrating the Larsen effect.

FIG. 1 illustrates a well-known configuration consisting of an input transducer, microphone A, amplification-transmission circuit B, and an output transducer, in this case speaker C. An "input" impedance adapter is typically installed at the input of circuit B and an "output" impedance adapter is installed at the output of circuit B. The sound produced by musical instrument D is picked up by microphone A, transformed into electrical signals to be sent to circuit B, amplified to a greater or lesser extent, and then sent to speaker C, which transforms the received electrical signals into sounds.

As shown, part of the sound transmitted by speaker C bounces off objects and surfaces in the surroundings and is picked up by microphone A, which is depicted by a simple arrow and dotted line F1. This sound is treated exactly like the main sound: i.e., it is transformed into electric signals, amplified and transmitted. If the feedback level is significant, this creates significant disturbances, such as the characteristic screech of the Larsen effect, as described above.

Figure 2:
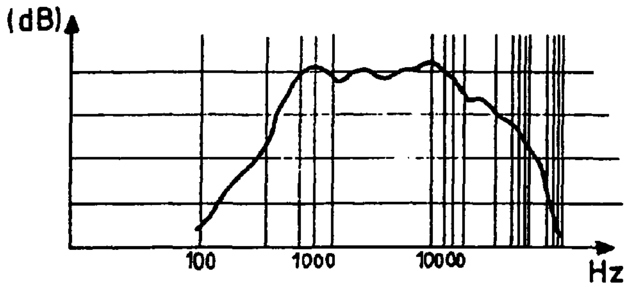
FIG. 2 is a graphic depicting a characteristic curve that could be that of the device in FIG. 1.

The characteristic curve of this familiar device may be that which is depicted in FIG. 2. As shown, the device has a transmission pattern for instantaneous sounds expressed in decibels (y-axis) that is highly variable depending on the frequency expressed in Hertz (the x-axis). A sound added at, for example, a frequency of approximately 1,000 Hertz will result in a particularly violent sound being transmitted because at this frequency, the device has a very high transmission capacity. The same would be true for each spike in the curve, which here is at approximately 2,000 and 9,000 Hz. By contrast, a sound added at a frequency of approximately 100 Hz, or, at the other extreme, over 100,000 Hz is practically imperceptible.

The invention enables the undesirable consequences of the Larsen effect to be eliminated. The invention does not operate using the same methods as previous attempts, namely via methods that have immediate and detrimental effects on transmission quality.

The primary cause of disturbances related to feedback or the Larsen effect is the non-linear nature of the device's characteristic curve. Starting from the basic principle that one cannot prevent sound from spreading freely, and thus, from bouncing back to the microphone from its point of transmission, the invention is based on a principle called "pre-stabilization", which involves making the characteristic curve as linear as possible until it practically becomes a straight line. In this way, the sensitivity of the input transducer (microphone), the power of the output transducer (speaker), and the relative proximity of these two transducers are of little importance—the sounds received after rebounding by the input transducer no longer have any material effect.

Figure 3:
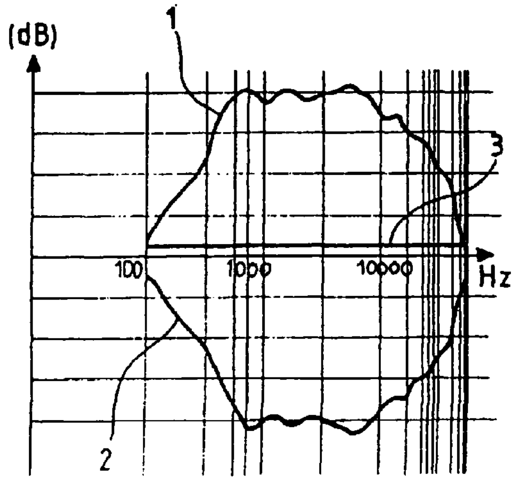
FIG. 3 is a theoretic graphic showing the basic operation of the invention, which consists of creating not only the device's characteristic curve, but also its symmetric curve, shifted 180 degrees, with the curve derived from the algebraic sum of the two theoretically being equal to a straight line lying directly over the x-axis.

FIG. 3 depicts the results of the signal treatment comprising part of this invention. Each sound transformed into an electronic signal corresponds to a point on upper curve 1 to create that particular device's characteristic curve. Using the invention, the signals referred to herein as "initial signals" are extracted to obtain signals referred to herein as "duplicate signals".

The duplicate signals derived from the initial signals are dephased by 180 degrees, creating curve 2, which is exactly symmetrical to curve 1. In other words, curve 2 is the mirror image of curve 1. From here on, the term "image signals" will be used to describe signals shifted by 180 degrees.

These series of signals are then combined to obtain the algebraic sum of the two.

If the amplitudes (expressed in decibels) of curves 1 and 2 were completely equal, the result of this algebraic sum would be equal to zero. It would consist of a straight line superimposed on the x-axis.

In other words, the signals provided to the output transducer (speaker) would be nonexistent. The sounds transmitted by the output transducer would then equal complete silence.

As this scenario is obviously not going to be reproduced in reality, it is necessary that the algebraic sum have a positive result (i.e., one that is greater than zero).

FIG. 3 shows that this is indeed the case, since line 3 representing the result of the algebraic sum of curves 1 and 2 lies above the x-axis.

Thus, during the operation of the device, regardless of the random fluctuations possible in the characteristic curve 1, the signal is combined with its negative mirror "image" and the device continues to produce a characteristic curve that is practically a straight line.

Figure 4:
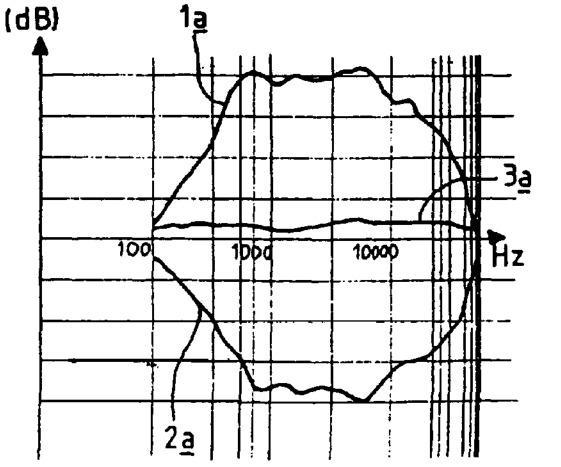
FIG. 4 is the same type as FIG. 3, but corresponds to an actual device in accordance with the present invention.

FIG. 4 shows a more realistic scenario in which the algebraic sum of curves 1*a* and 2*a* gives rise to curve 3*a*, which is very close to a straight line, but is nonetheless slightly curved. The consequences of feedback on the sounds transmitted are nonetheless imperceptible since the resulting curve 3*a* no longer has even a single spike.

Figure 5:
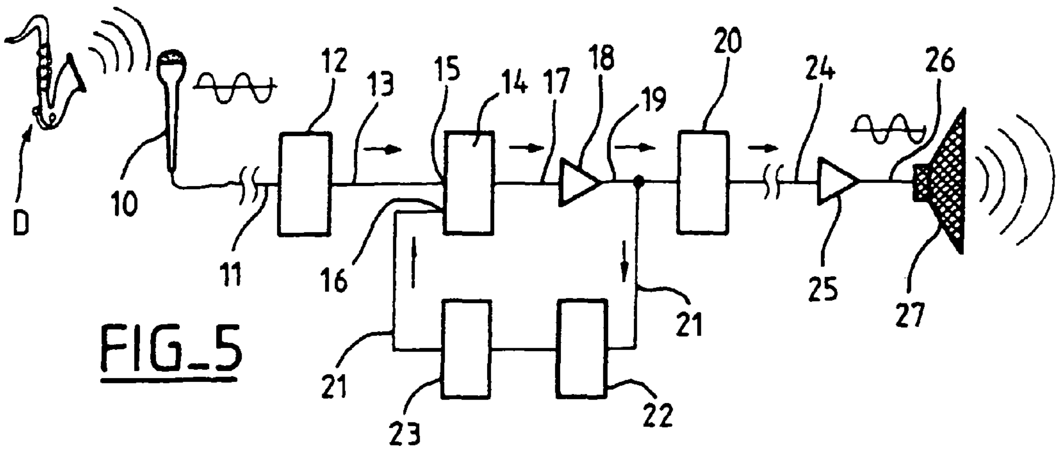
FIG. 5 is a general diagram of a device in accordance with the invention.

FIG. 5 depicts a device, such as a public address system, in accordance with the present invention. It includes an input transducer represented by a microphone 10, a connector 11, an input impedance adapter 12, a connector 13, a linear mixer 14 having two inputs 15 and 16, a connector 17, a linear amplifier 18, a connector 19, an output impedance adaptor 20, and a branch circuit 21 leading to the second input 16 on the linear mixer 14, Branch circuit 21 includes an adapter 22 and a phase inverter 23 connected in series.

The signals exit from the output impedance adapter 20 on connector 24 and then to power amplifier 25. The signals then pass through connector 26 to an output transducer consisting of a speaker 27.

This device operates as follows:

The sound emitted by the musical instrument D is collected by the microphone 10, which in turn converts the mechanical vibrations of the air into corresponding electronic signals (input signals) that are then handled by the electronic circuits.

The signals transmitted by connector 11, or "input signals," are brought to an acceptable impedance level by adapter 12, the operation of which is well known by people in the industry.

At the output of the linear amplifier 18, the signals ("initial signals") are sent to the output impedance adapter 20, and a duplicate of these signals is sent to circuit branch 21. These duplicate signals ("duplicate signals") are sent to the phase inverter 23 via adapter 22.

This inverter 23 creates a phase shift of 180 degrees, which graphically results in the creation of the points of curve 2, at the same time that the initial signals create the points of curve 1.

As is well known, the effect of electronic circuits on AC signals is based on the frequency of these signals. Thus the dephasing is typically not uniformly 180 degrees for all signal frequencies received by the phase inverter 23 because components of different values are needed for each frequency. However, in certain embodiments of the invention, well-known operational amplifiers may be used, making the dephasing uniform across the entire audio frequency bandwidth. As a result, an average dephasing is accomplished in which the phase change is as close as possible to 180 degrees.

The resulting signals ("image signals") are carried to input 16 of the linear mixer 14, which in turn provides signals that are the result of the algebraic sum of input signals received by input 15 and the image signals received by input 16.

The characteristic curve of the combined signals (i.e., the input signals plus the image signals) resulting from the linear mixer 14 is similar to curve 3*a*—i.e., the characteristic curve is almost a straight line, as each frequency was amplified the same way by the power amplifier 25.

When operating in accordance with known techniques, the duplicated signals are calibrated so as to be only a fraction of the original signals.

This "calibration" can be obtained by a resistor, which, significantly, reduces the level to make it compatible with that of the input signals, which is very low.

The result of this process is the introduction of a time factor, which creates a slight delay between the input signal and the image signals. As a result, it is never possible to take the algebraic sum of the two types of signals since there is a shift between curves 1 and 2.

It is possible that, by chance, a positive value will correspond with the same negative value, but it is impossible to ensure that everything operates normally. Even worse, if a strong positive value or spike happens to correspond with a weak negative value, the result is abrupt amplification with violent Larsen effect.

Although it is possible to obtain an acceptable mix on a narrow bandwidth of frequencies, the opposite effect is obtained on the harmonic values of this bandwidth. In other words, even if the feedback can be avoided at certain frequencies, it is only strengthened at others.

As a result of these circumstances, previous attempts to use phase return were unsuccessful, even to the extent that manufacturers highlighted as an advantage in their technical specifications the fact that their products did not use phase return.

Using the present invention however, there is no delay between the input signals leading to input 15 and the image signals leading to input 16 since there is no time factor to create a delay. If there was a discrepancy resulting from the resistor in adapter 22, it would be completely insignificant and have no effect because the resistance of the resistor is extremely small and only equalizes (rather than changing) the output level of operational amplifier 18 at connector 19 and its input level at connector 17.

In addition, as shown below, this resistor may simply be eliminated.

The eventual discrepancy is measured in microseconds and is imperceptible to the human ear.

Figure 6:
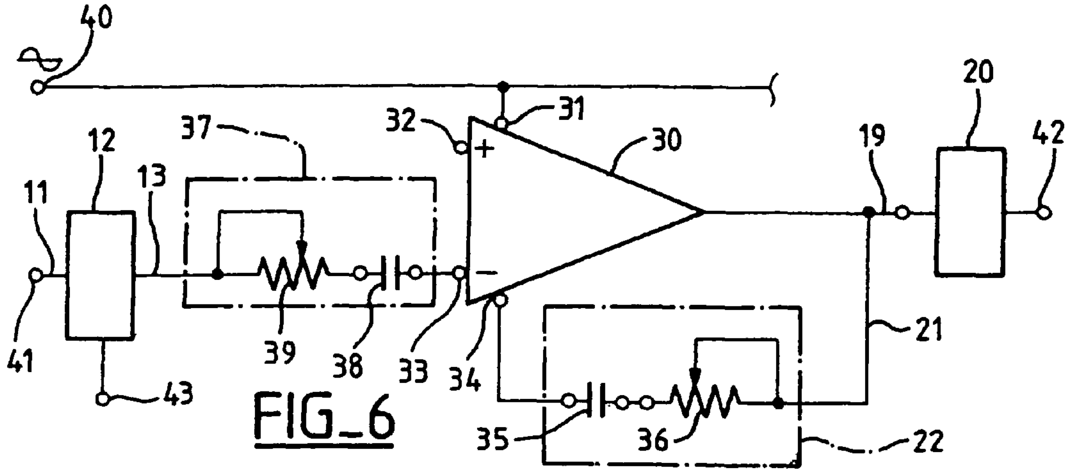
FIG. 6 is a more detailed diagram than the one in FIG. 5 and is more specifically focused on an embodiment of the invention's characteristic branch circuit.

FIG. 6 provides an example of a circuit in accordance with the invention that is simple and economical. The elements have the same reference numbers as the elements that are depicted in FIG. 5.

Instead of linear amplifier 18, an operational amplifier 30 (or audio amplifier) is used, a type that is well known by people in the industry and is currently available in various forms with different features.

It exists in the form of an integrated circuit, which considerably reduces the number of components needed outside of the operational amplifier 30.

Operational amplifier 30 has an input 31 for the power supply, and inputs 32 and 33 marked "+" and "−" respectively, as well as multiple other inputs (not shown) that are separate from those mentioned previously.

Input 33 is marked "−" to signify that the signals that will enter here will be dephased 180 degrees.

The input signals coming from the microphone 10 enter operational amplifier 30 at input 33 "–", whereas circuit branch 21 is connected to dynamic input 34, allowing the mixing of image signals and input signals and resulting in their linear distribution, which is the desired effect.

The purpose of adapter 22 is not to calibrate the duplicate signals so that they have a different level than those of the initial signals, but rather to equalize the signals at the input and output of amplifier 30 as described above.

Adapter 22 includes a capacitor 35, 15 to 20 μF (micro Farad) for example, connected to a very low resistance variable resistor 36, 10 Ω (Ohm) for example. Because of the relative values of these components, adapter 22 does not cause any perceivable delay in the transfer of the duplicate signals.

This feature of the invention is important as it guarantees that the input signals and the image signals are sufficiently simultaneous, such that there is practically no discrepancy between curves 1*a* and 2*a* (FIG. 4). The resulting curve, 3*a*, is thus straight, or almost straight with no spikes.

The operational amplifier 30 carries out the dephasing and mixing of both types of signals, as well as their amplification.

However, the level of output at 19 remains equal to the level of output at 17 after the eventual adjustment of the variable resistor 39.

At the (13-17) connections (the linear mixer is removed) is adapter 37, which includes a capacitor 38 connected to a variable resistor 39. Adapter 37 allows the level of the input signal to be adjusted before it reaches the operational amplifier 30.

This highly simple and compact circuit can be integrated into a single component, which is small and consisting of synthetic materials (or "resin") with contacts 40, 41, 42 and 43 (exposed conductive parts) that are accessible from the outside to attach it.

It can also be combined with other circuits and/or components in a single resin structure so that it is very difficult, even impossible to isolate it to identify its uniqueness.

This uniqueness, however, may be identified by isolating the circuit, or even by removing it and reattaching the connections, cutting one or more of its external connections, or using a shunt to neutralize it.

Before doing this, the Larsen effect is not observable, whereas afterward it is present.

Naturally, when the circuit that is the object of the invention is combined with other components and/or circuits, the demonstration is more difficult because in isolating the circuit, the other components and/or circuits are also isolated in such a way that the entire structure being examined is no longer operational.

After having carried out this excessive "subtraction" of components, it is necessary to compensate for it with an "addition", by adding the missing components.

In this way, the structure being examined is recreated without the inventive circuit and is functional. However, before these operations the Larsen effect is not observable, whereas after them it is present.

However, all of this is useless if it is possible to directly observe the presence of the circuit that is the object of the invention, specifically on printed circuits (or "cards") or on diagrams.

In view of the considerable number and diversity of operational amplifiers and low frequency amplifiers available on the market that can be used to implement the invention, the components associated with amplifier 30 itself are not represented in FIG. 6, since these components are already well known to people in the industry.

The compactness and low cost of the circuit that is the object of the invention allow it to be used for multiple applications that cannot be listed in an exhaustive fashion. These applications include, but are not limited to, the following: telephone telecommunication channels, wireless telephones, telephones, cordless phones, microphones, magnetic pickups, hearing aids, etc.

Figure 7:
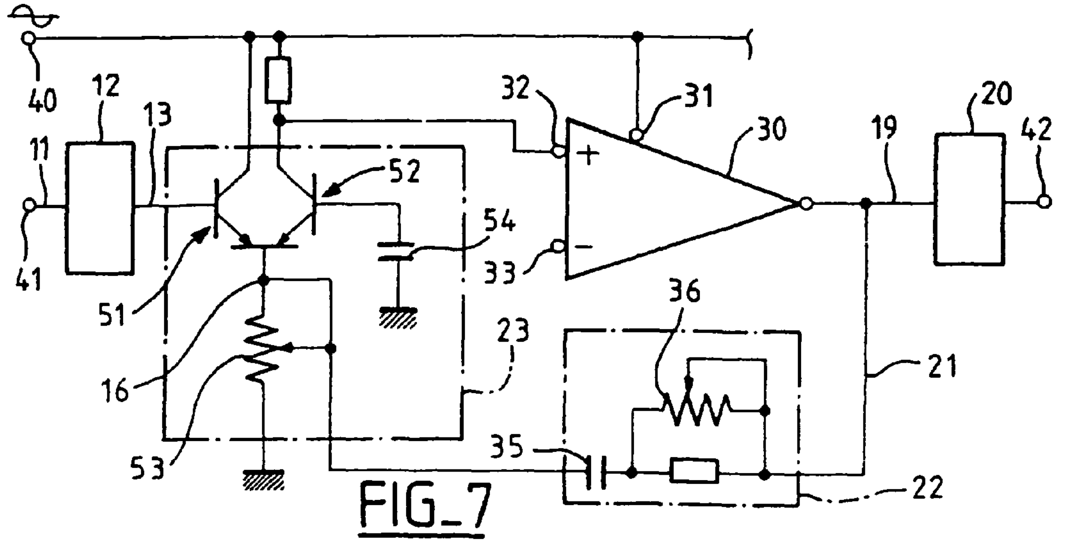
FIG. 7 is a more detailed diagram than FIG. 5 that is specifically focused on an embodiment of the linear mixer.

FIG. 7 shows a more detailed, high performance operating mode designed for professional installations with high level technical requirements. Applications for this embodiment include, but are not limited to, the following: public address systems, television and radio broadcasters, recording studios, etc.

The invention offers sound reproduction quality that far surpasses the current requirements of major industry players in terms of both the purity and fidelity of the reproduced sounds when compared with the original sounds.

The elements in FIG. 7 bear the same reference numbers as the corresponding elements in FIGS. 5 and 6.

In this embodiment, the input 32"+" to operational amplifier 30 is used rather than the input 33 "–" used previously. The initial signals at connection 19 are accordingly not shifted 180 degrees.

Phase inverter 23 in this embodiment comprises two transistors 51 and 52 mounted head-to-tail and a low resistance adjustable resistor 53.

The input signals from microphone 10 are passed through connector 13 to the base of transistor 51, while the duplicate signals from branch circuit 21 are applied to its emitter.

The adjustable resistor 53 is used to adjust the level of the inverter 23 to that of the microphone 10, which can be either static or dynamic.

The purpose of this assembly is to make the signals collected at the emitter of transistor 51 linear, exactly as if the characteristic curve of the microphone 10 was itself linear, which in reality is not the case.

In other words, the impedance of microphone 10, which is more reactive for frequencies higher than 1,000 Hz (Hertz) is changed by a very low resistor by adjusting resistor 53 without losing its sensitivity.

Because the value of a resistor is independent from the frequency of the signals transmitted, the signals collected from the emitter of transistor 51 are smooth and linear without spikes and cannot create even the slightest Larsen effect. It is understood that this feature is of the highest importance because it eliminates the major fault of all microphones, i.e., the degree to which they are non-linear.

Because the purpose of a transistor is to provide signals with much higher levels than those received, the input signals received from the emitter of transistor 51 are both linear and amplified.

The features of transistor 51 can be freely chosen so that it provides input signals that are compatible with the duplicate signals, which is why the variable resistor 36 of adapter 22 cannot only be very small, but even completely eliminated.

In summary, the input signals are adjusted to the duplicate signals, whereas in the previous examples, the duplicate signals have been adapted to the input signals.

The phase inverter 23 carries out the dephasing of a delay of a half phase between the initial signals and the input signals because of the combination of the resistor 53 and the capacitor 54.

The transistor 52 collects the mixed signals, which are essentially linear and inputs them into the "+" input 32 of the operational amplifier 30, since they only need to be amplified and not re-dephased.

The transistor 51 dynamically mixes the two types of signals, regardless of their frequencies.

In an audio assembly, the most defective and non-linear element is the microphone. As it is placed at the entry to the assembly, its non-linearity is multiplied by the amplification and ends up in the total gain.

For example, when a microphone produces several millivolts and the output power consists of several dozen watts, the following is obtained:

$$\sqrt{g} = \frac{(10/1000)^2}{600} \times G = \frac{100 \text{ Watts}}{4}$$

in which:

G=power gain g=voltage gain

The result is:

G=1,500,000,000 g=12,250

The defects due to the non-linear nature of the microphone are thus amplified in this example 12,250 times.

Professionals do not take into account jumps in amplitude of the characteristic curve of microphones that are less than or equal to twice the base value.

As a result, deformities in this curve affect the output power and are amplified 12,250 times. The resulting sound is transmitted and then bounces off objects, obstacles and walls before returning to the microphone. It is thus easy to understand that these defects in linearity result in a deafening and intolerable screech when an attempt is made to increase the power.

With the invention, the microphone also picks up the feedback sounds, deforms them and transcodes them into input signals at connection 13.

The duplicate signals enter at point 16, which corresponds to the output of the phase inverter 23, and are dephased with respect to the input signals.

When the system begins to get unstable, the level of the input signals taken in at connection 13 increases, as do those of the opposite signals taken in at point 16.

The signals taken in at connection 13 introduce a weak current into the base of transistor 51, which, due to amplification, is more significant in the emitter at point 16.

As the duplicate signals enter at the same point 16, they generate an opposite current in variable resistor 53.

However, the difference between the two types of signals remains unchanged and the system does not have a tendency to fluctuate, which is what gives rise to the Larsen effect.

By reducing the resistance of resistor 53, the current in the emitter caused by the input signals increases, but by also reducing the resistance of resistor 36 of adapter 22, the opposite current of the mirror image increases and the difference between the two currents does not change.

The low resistance (up to only a few dozen Ohms) of resistor 53 opens the base-emitter junction of transistor 51, meaning that the microphone is dynamically parallel with variable resistance 53.

In conclusion, the microphone with a resistance of hundreds of Ohms, which is reactive and non-linear, becomes an assembly of only a few dozen Ohms that is purely resistive (and not reactive) and naturally linear with the same sensitivity.

It is necessary to note that a non-reactive, linear microphone does not exist in reality.

The invention was described in terms of its use in devices that include a microphone, an amplification chain and a speaker. However, as previously indicated, it can be used in conjunction with many other electronic devices for which the linearization of input signals is important. It can also be used for the treatment of mechanical vibrations, where it is useful to linearize a transducer that transforms mechanical vibrations into electronic signals.

The invention claimed is:

1. A system for linearizing characteristic curve of a vibrating signal transducer, said system comprising:

an amplifier;

an adapter;

a transistor pair, connected to each other at said transistor pair's emitter terminal;

wherein an input signal is transmitted to a base of one of said transistor pair, after being captured by an input transducer;

a resistor, connected to said transistor pair's emitter terminal;

wherein a collector of one of said transistor pair is connected to an input of said amplifier;

and output of said amplifier is connected to said transistor pair's emitter terminal, through said adapter.

2. The system for linearizing characteristic curve of a vibrating signal transducer as recited in claim 1, wherein said system comprises one variable resistor.

3. The system for linearizing characteristic curve of a vibrating signal transducer as recited in claim 1, wherein said system comprises one operational amplifier or audio amplifier.

4. The system for linearizing characteristic curve of a vibrating signal transducer as recited in claim 1, wherein said system comprises a signal equalizer.

5. The system for linearizing characteristic curve of a vibrating signal transducer as recited in claim 1, wherein said input transducer is a microphone.

6. The system for linearizing characteristic curve of a vibrating signal transducer as recited in claim 1, wherein said input transducer is an static or dynamic microphone.

7. The system for linearizing characteristic curve of a vibrating signal transducer as recited in claim 1, wherein said system is used in a hearing aid, cell phone, public announcement system, TV, radio broadcast, or recording.

8. The system for linearizing characteristic curve of a vibrating signal transducer as recited in claim 1, wherein said system is implemented in an integrated circuit.

9. The system for linearizing characteristic curve of a vibrating signal transducer as recited in claim 1, wherein said adapter equalizes signals.

10. The system for linearizing characteristic curve of a vibrating signal transducer as recited in claim 1, wherein said amplifier is an operational amplifier or audio amplifier.

11. The system for linearizing characteristic curve of a vibrating signal transducer as recited in claim 1, wherein said resistor is a variable or adjustable resistor.

12. The system for linearizing characteristic curve of a vibrating signal transducer as recited in claim 1, wherein said adapter comprises a resistor and a capacitor.

13. The system for linearizing characteristic curve of a vibrating signal transducer as recited in claim 1, wherein said system comprises a phase inverter.

14. The system for linearizing characteristic curve of a vibrating signal transducer as recited in claim 1, wherein said system comprises a signal mixer.

15. The system for linearizing characteristic curve of a vibrating signal transducer as recited in claim 1, wherein output of said system is transmitted to one or more output transducers or speakers.

* * * * *